(12) United States Patent
Mahajan et al.

(10) Patent No.: US 6,226,650 B1
(45) Date of Patent: May 1, 2001

(54) DATABASE SYNCHRONIZATION AND ORGANIZATION SYSTEM AND METHOD

(75) Inventors: Sameer S. Mahajan, Beaverton, OR (US); Michael J. Donahoo, Austell, GA (US); Shamkant B. Navathe, Alpharetta, GA (US); Mostafa H. Ammar, Doraville, GA (US); Frank H. McGeough, Dunwoody, GA (US); Sanjoy Malik, Atlanta, GA (US)

(73) Assignee: Synchrologic, Inc., Alpharetta, GA (US)

( * ) Notice: Subject to any disclaimer, the term of this patent is extended or adjusted under 35 U.S.C. 154(b) by 0 days.

(21) Appl. No.: 09/156,075

(22) Filed: Sep. 17, 1998

(51) Int. Cl.$^7$ ........................................ G06F 17/30
(52) U.S. Cl. .................... 707/201; 707/10; 707/203; 379/93.12
(58) Field of Search .................. 707/8, 10, 201, 707/203; 379/93.12

(56) References Cited

U.S. PATENT DOCUMENTS

| | | | |
|---|---|---|---|
| 4,645,873 | 2/1987 | Chomet | 379/93.12 |
| 4,648,036 | 3/1987 | Gallant | 707/203 |
| 5,276,901 | 1/1994 | Howell et al. | 707/9 |
| 5,490,270 * | 2/1996 | Devarakonda et al. | 707/201 |
| 5,491,820 | 2/1996 | Belove et al. | 707/3 |
| 5,551,027 * | 8/1996 | Choy et al. | 707/201 |
| 5,574,904 | 11/1996 | Yunoki et al. | 707/4 |
| 5,630,124 * | 5/1997 | Coyle, Jr. et al. | 707/103 |
| 5,649,195 | 7/1997 | Scott et al. | 707/201 |
| 5,675,791 * | 10/1997 | Bhide et al. | 707/205 |
| 5,687,363 | 11/1997 | Oulid-Aissa et al. | 707/1 |
| 5,721,905 * | 2/1998 | Elixmann et al. | 707/8 |
| 5,737,601 * | 4/1998 | Jain et al. | 707/201 |
| 5,835,757 * | 11/1998 | Oulid-Aissa et al. | 707/10 |
| 5,842,207 * | 11/1998 | Fujiwara et al. | 707/7 |
| 5,870,761 * | 2/1999 | Demers et al. | 707/201 |
| 5,924,094 * | 7/1999 | Sutter | 707/10 |

* cited by examiner

Primary Examiner—Hosain T. Alam
Assistant Examiner—Jean Bolte Fleurantin
(74) Attorney, Agent, or Firm—Thomas, Kayden, Horstemeyer & Risley LLP

(57) ABSTRACT

The present invention provides a "data centric" approach to updating databases on computer systems of an intermittently connected database system. In this approach, the storage and processing complexity of the database server are de-coupled from the number of clients to be supported, thereby, improving the scalability of the server. Instead of focusing on the data required by individual clients, this method tracks changes to data subsets pertaining to groups of clients. Thus, the server need only track and record changes to these subsets of data, instead of tracking changes for individual clients. Clients download the subsets, which contain the data relevant to the group, and merges data or deletes superfluous data from the subsets. Since the server is tracking a limited set of data subsets related to groups of clients instead of the actual number of the clients, the overall scalability of the system is increased. In this system, client computer systems are synchronized with a server database by dividing data to be distributed from a server database into groups and assigning one or more of the groups to each client computer system. When a client computer system accesses the server, the client computer system sends changes made to its local database to the sever. The server updates its database with these changes. After making the updates to its database, the server determines which groups share in the changes made, and creates modification files for these groups. The clients download the modification files for the groups to which they are assigned.

19 Claims, 7 Drawing Sheets

FIG. 3A

STUDENTS(STUDENTID, NAME, PHONE#, CLASS {UNDERGRAD, GRAD})
— 112    114    116    118    120    122    124

ENROLL(STUDENTID, COURSE ID, GRADE)
— 134    136    138    140

COURSES(COURSEID, NAME, CLASS {UNDERGRAD, GRAD})
— 150    152    154    156    158    160

FIG. 3B

| GROUP | GROUP DATASET |
|---|---|
| UNDERGRADUATE-STUDENTS | STUDENTS(STUDENTID,NAME,{UNDERGRAD}) |
| GRADUATE-STUDENTS — 202 | STUDENTS(STUDENTID, NAME, {GRAD}) |
| STUDENTS-PHONE — 206 | STUDENTS(STUDENTID, PHONE) |
| ALL-COURSES — 210 | COURSES(ALL DATA) |
| ALL-ENROLL — 214 | ENROLL(ALL DATA) |
| — 218 | |

FIG. 3C

| CLIENT TYPE | ASSIGNED GROUPS |
|---|---|
| UNDERGRADUATE | UNDERGRADUATE-STUDENTS — 202<br>ALL-COURSES — 214<br>ALL-ENROLL — 218 |
| GRADUATE | GRADUATE-STUDENTS — 206<br>ALL-COURSES — 214<br>ALL-ENROLL — 218 |
| PROFESSORS | GRADUATE-STUDENTS — 206<br>UNDERGRADUATE-STUDENTS — 202<br>STUDENTS-PHONE — 210<br>ALL-COURSES — 214<br>ALL-ENROLL — 218 |
| ENROLLER | ALL-ENROLL — 218 |

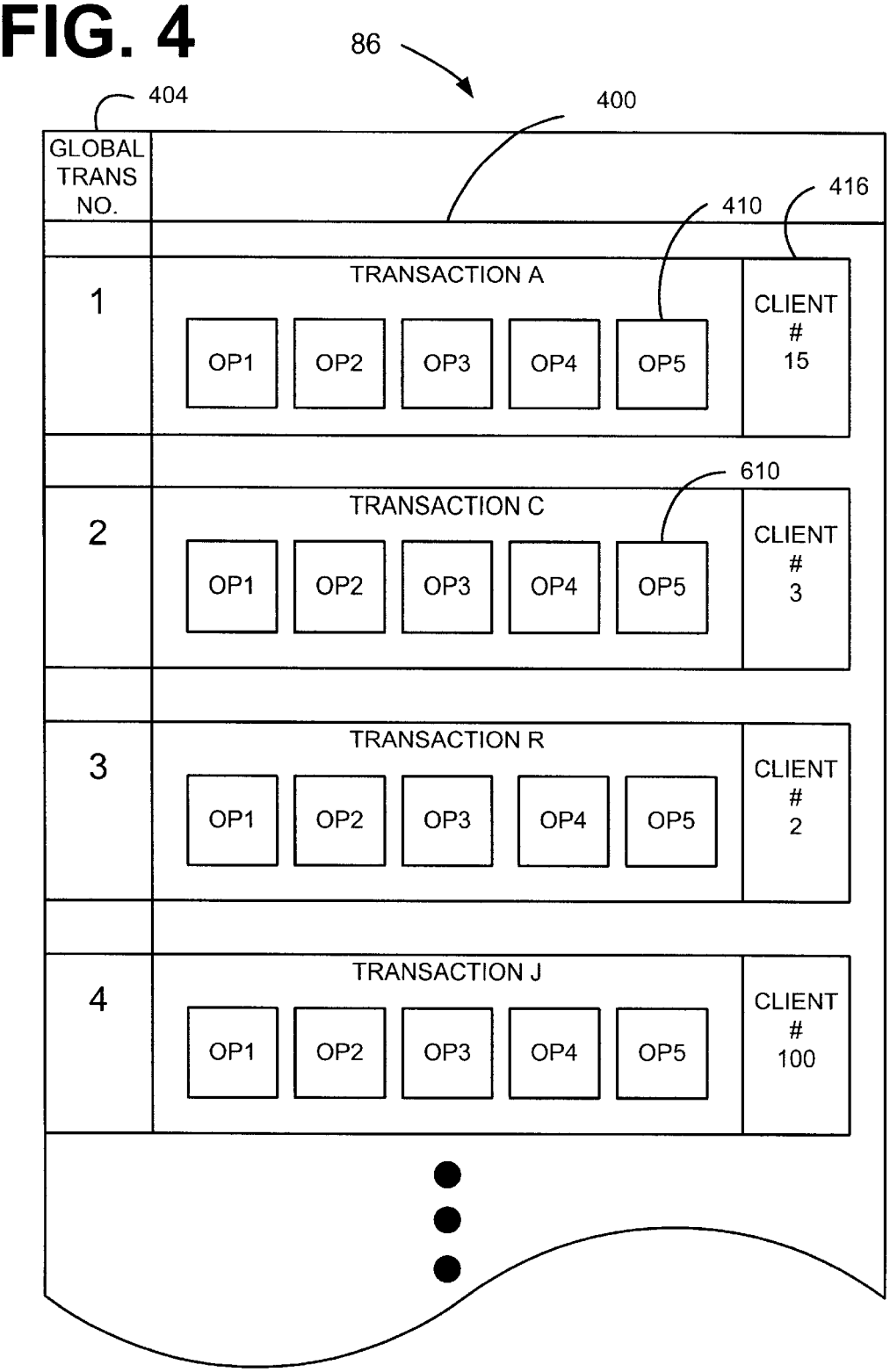

DATABASE SYNCHRONIZATION AND ORGANIZATION SYSTEM AND METHOD

FIELD OF THE INVENTION

The present invention relates to a method and system for updating databases, and more particularly, relates to a method and system for synchronizing remote databases.

BACKGROUND OF THE INVENTION

In many business environments, a server database ("central") is used to store data that is pertinent to many employees or remote users of a business. The server database is typically accessible by remote computer systems ("clients") to increase the availability of information to the remote users. By providing a server database, which may be accessed by remote computer systems, dissemination of information through the company is increased. Remote access to a server database is more critical in environments where a sales force or many employees operate away from the office. As an example, the remote employees rely on the information contained within the database to be informed about inventory changes, pricing data, and company events. Rather than remain connected to the server database indefinitely and collect telecommunication charges or tie up phone lines, the remote users only intermittently connect their computers to a server for access to the server database. In these environments, the remote computer systems typically store a portion of the server database locally to support the remote application even when the client is not connected to the server. The intermittent connection is then used to send only changes made by the client application to the server and a pertinent set of changes from the server to the client. This type of remote computer system environment is called an Intermittently Connected Database (ICDB) environment. ICDBs have a wide variety of applications in sales force automation, insurance claim processing, and mobile work forces in general.

An important communication issue for this type of computer environment is the timely and efficient exchange of information between the clients and the server database. The term "database synchronization" is often used to describe the process of maintaining data consistency and integrity among server databases and client databases. There are many synchronization schemes for maintaining consistency. In some known database synchronization schemes, a time stamp is associated with the exchanged data that specifies the date of the last update exchange. The server database and the client database use the time-stamp to determine which records have been modified. Other schemes use bit-maps to mark records that have changed. Still other schemes use "before values" to track changes. Typically, only those records modified since the last data exchange are sent.

In ICDB environments, continuous access to an application requires that each client maintain a local copy of the data it shares. In addition, with intermittent connectivity, direct exchange of information between clients is not possible; consequently, some intermediary is required to facilitate inter-client communication and data sharing. Traditionally, a database server whose schema and data consists of the union of the client schemes and data fills the role of this intermediary. This server is continuously available for connection to the intermittently connected clients. Updates from a client are sent to the server. The server determines the set of clients who share in this data and need to receive a copy of the update. Thus, in this "client-centric" approach, the server has to generate a separate data set for each client. Unfortunately, this approach increases in complexity with each additional client and is limited in scalability with respect to the maximum number of clients that can be supported by a server because for every additional client, the server must repeat the same type of processing it did for other clients.

Many other techniques exist for ensuring reliable synchronization. A technique for ensuring the reliability of data synchronized for remote databases is discussed in U.S. Pat. No. 5,649,195 to Scott, et al. (the "'195 Patent"). In this system, each remote computer contains a replica of a master database. The central computer of the '195 Patent stores record changes made to the master database for a pre-defined unit of time in a file. Each change record for the same unit of time is associated with the same broadcast number and sequence number. The sequence number identifies the sequential order of the change records in the file. The last change record in the sequential order is identified as the last record for a particular broadcast number. For the next unit of time, the broadcast number is incremented and the sequence number reset. After a pre-defined unit of time has expired, the file of change records is transmitted to the remote replica databases. The remote computers use the broadcast and sequence numbers to verify the order of the change records to determine whether all change records for a broadcast have been received and correctly used to update the remote replica database.

Another system for updating information in a database is described in U.S. Pat. No. 5,491,820 to Belove, et al. (the "'820 Patent"). The '820 Patent is directed to a client/server system that uses an object-oriented database at the server to provide data to intermittently coupled clients. In this system, data objects are maintained in the database. These data objects may be transmitted to a client coupled to the server and later updated upon re-establishment of communication with the server. Upon receipt of a data object, a client associates a time of receipt with the data object. In requesting an object update, the client transmits a list of data objects to be updated along with the time of receipt for each object. The server maintains a last modified time for each data object and compares the time of receipt for a data object in a data object list received from a client to its last modified time. The server provides new versions of these data objects that have been modified since the last time of receipt.

In a typical synchronization system an individual file containing changes to be sent is created on the server for each client within the system. This ties up the server, increasing the amount of processing done on the server to create these files which is directly proportionally to the number of clients in the system. What is needed is a database synchronization system that allows the database to be scaled for use by increasing the numbers of clients without negatively impacting server performance.

SUMMARY OF THE INVENTION

Generally, the present invention provides a method that reduces the storage and processing required in an ICDB system. The reduction in processing improves the ability of a server to handle more client computers. More particularly, the present invention provides a method for synchronizing client computer systems with a server database by dividing data to be distributed from a server database into groups and assigning one or more of the groups to each client computer system. The changes to the data in the groups are stored to be sent to the clients subscribing to the groups.

When a client computer system dials in or "connects" to the server, it sends changes made to its local database to the server. The server may then update its database with changes submitted by the client. After making the updates to its database, the server determines which groups share in the changes made, and creates modification files for these groups. The clients may then download the modification files for each of the groups to which a client subscribes. As the modification files may contain superfluous data, they are evaluated on the client to determine if certain updates should be applied and merged or discarded.

Each client contains a list of groups to which it subscribes. When a client connects to the server, the client requests the modification files corresponding to the groups to which it subscribes, merges the downloaded modification files, filters the superfluous data, and updates its local database.

Therefore, it is an object of the present invention to provide a database synchronization method and system that improves the ability of a server database system to handle more client computer systems.

It is the object of the present invention to achieve this by grouping data to improve the scalability of the database system.

These and other objects will be apparent to those skilled in the art from a review of the drawings and descriptions contained herein.

BRIEF DESCRIPTION OF THE DRAWINGS

FIGS. 3a, 3b, and 3c are examples of the grouping of data in a server database and client association with these groups according to the principles of the present invention.

FIG. 4 is a diagram of a modification file format used in connection with the present invention.

DETAILED DESCRIPTION OF THE INVENTION

Figure 1:
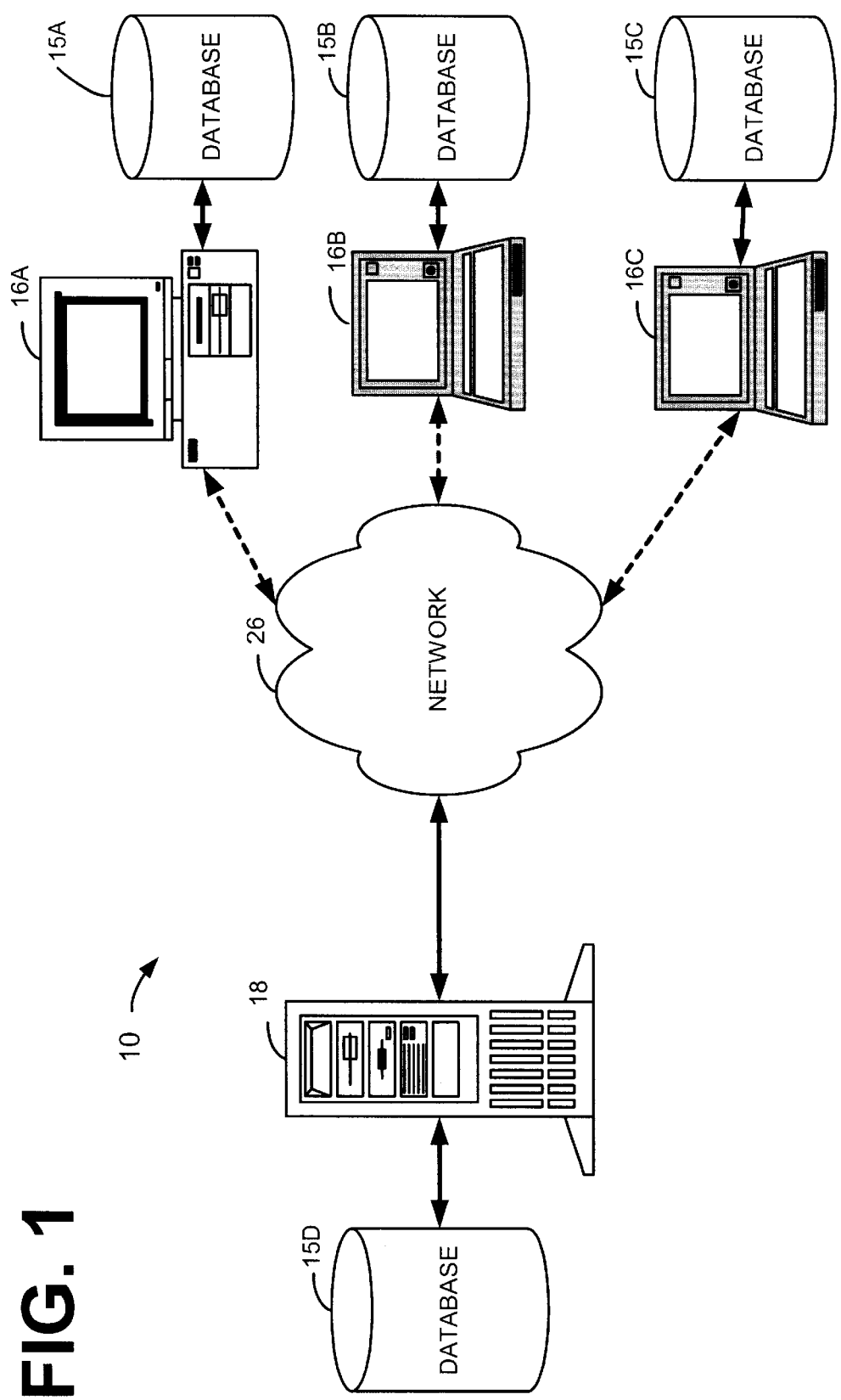
FIG. 1 is a diagram of an ICDB.

Referring now to the drawings, in which like numerals illustrate like elements throughout the several views, FIG. 1 illustrates the basic components of an intermittently connected database system ("ICDB") 10 used in connection with the preferred embodiment of the present invention. The ICDB system 10 includes client computer systems 16a, 16b, and 16c. Each client has applications and a local database 15a, 15b, and 15c. A computer server 18 contains applications and a server database 15d that are accessed by client computer systems 16 via intermittent connections 27. The server 18 runs administrative software for a computer network and controls access to part or all of the network and its devices. The client computer systems 16 share data of the server database stored at the computer server 18 and may access the server 18 over the Internet, a local area network (LAN), a wide area network (WAN) 26 or via a telephone line using a modem. The server 18 may be connected to the local area network (LAN) within an organization.

The structure and operation of the ICDB system 10 enables the server 18 and the server database 15d associated therewith to handle clients more efficiently than previously known systems. Particularly, the present invention provides a manner of organizing data of the server database into selected groups and tracking changes of data according to the groups, instead of individual clients. Periodically, a modification ("delta" or "update") file is created for each group with all relevant changes since the last modification file creation. Client computer systems 16 are associated with selected groups and when the clients connect to the server 18, the modification files associated with the group are transmitted to the client or clients associated with the group to be used for updating each client's individual database.

The client computer systems 16a, 16b and 16c may each be located at remote sites. Thus, when a user at one of the remote client computer systems 16 desires to be updated with the current information from the shared database at the server 18, the computer system 16 communicates over the WAN or telephone line to access the server 18. Advantageously, the present invention provides a system and method for updating client computer systems that enable client computer systems to be added to the ICDB system without requiring the ICDB system to create client-specific modification files for each client, added to the computer system. In this system, data on the server may be arranged in groups based on content and semantics. One or more of the groups are assigned to each client depending on the data requirements of the client. Periodically, the server determines the data that has changed for each group since the last evaluation, and records those changes in a modification file. When a client connects to the server, it requests the modification files for the groups to which it subscribes, merges the downloaded modification files, filters the superfluous data, and updates its local database.

Hence, the present invention provides a "data centric" approach to distributing changes. In this approach, the storage and processing complexity of the database server are de-coupled from the number of clients to be supported, thereby, improving the scalability of the server. Instead of focusing on the data required by individual clients, this method tracks changes to data subsets pertaining to groups. Thus, the server need only track changes to these subsets of data, instead of tracking changes for individual clients. Clients then download the subsets, which contain the relevant data from the server and filter out any superfluous data, which does not relate to them. Since the server is tracking a limited set of data subsets related to groups of clients instead of the actual number of the clients, the overall scalability of the system is increased.

Database Synchronization

Figure 2:
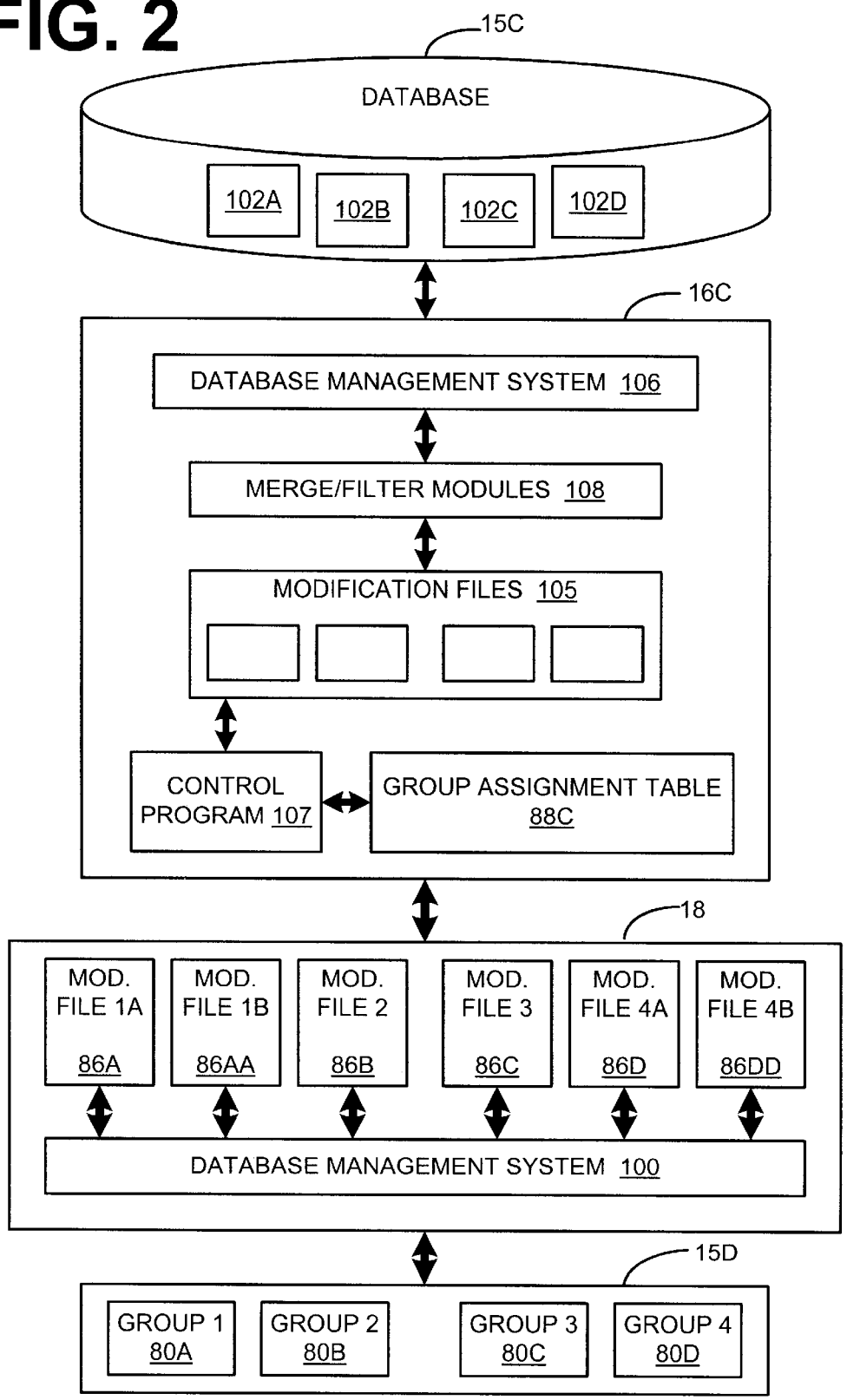
FIG. 2 is a detailed block diagram of client components and server components utilized during an update of a client from a server.

Referring to FIG. 2, a block diagram of the primary components utilized during the updating of databases within the ICDB system 10 is illustrated. Many components of a standard computer system have not been illustrated such as address buffers, memory buffers and other components because these elements are well known and are not necessary for understanding of the present invention. Computer programs and data files, illustrated in FIG. 2, are used to implement the various steps of the present invention. The processes of the invention may operate on personal computers ("PCs"), workstations and servers.

As discussed generally above, the system of the present invention improves the ability of a database system to process and handle more clients than in previously known systems. By grouping the data within the database 15d into data groups 80 and by associating individual modification ("delta") files 86 with each group 80, the overhead associated with managing the ICDB system 10 is decreased and therefore the scalabilty of the database system is improved. For example, in FIG. 2, four data groups 80a, 80b, 80c, and 80d have been defined within the database system 15d. The data items within each data group are not necessarily exclusive. That is, the data groupings can contain references to the same data items. For each of the data groups 80, a series of modification files 86 has been associated with a group. Periodically, the system administrator creates a new modification file for each group containing all of the updates for the data corresponding to the group since the last modification file was created. Modification files 86a, 86b, 86c, and 86d are associated with data groups 80a, 80b, 80c and 80d, respectively. Update files 86aa and 86dd are associated with modification files 80a and 80d, respectively. When changes are made to any of the items within one of the data groups 80a–d, the changes are recorded in the database. Although hundreds of clients may be connected to the ICDB system 10, a relatively small number of files 86a–dd, in this example, are used to identify changes within the data groups 80a–d. In previously known systems, the ICDB system would have modification files associated with each client identifying all of the altered data items to which the client has access. Therefore, in these previously known systems, the database management system would store and maintain a set of client files for each and every client. Advantageously, by utilizing the system of the present invention which groups data items into data groups 80 and associates the modification files for each of the data groups, the overhead maintenance and processing for an ICDB system is substantially reduced.

When a client computer system 16 is coupled for communication with the server database 15d, the database management system 100 provides an interface between the server database 15d and the client computer system 16c. It should be appreciated that the client computer system 16c is representative of the client computer systems 16a and 16b. The client computer system 16c also has a database management system 106 that provides an interface between the local database 15c and other computer systems. In the ICDB system 10, the client computer system 16 maintains portions of the data contained in the database. The portions of data used at the client computer system 16 may be considered a subset of the data of the server database and are stored in a local database 15c. The local database 15c contains information relevant to processes of the client computer system 16c. The client computer system 16c retrieves data from associated data groups 80, and the data is stored to the local database 15c. Similarly, when the data items within the local database 15c are modified, the modifications are transmitted to the server database 15d from the client computer system 16c which are used to update the server database 15d. During the transfer of information from either the local database 15c or the server database 15d, the data being transmitted is synchronized with the appropriate database.

A client computer system 16c, accessing the server database 15d, contains a list or table 88c of the set of groups it needs. The client computer system contacts the server system and requests the current modification files for the groups associated with the client computer system. A control program module 107 manages the operations at the client computer system 16c. At connection-time, the client computer system 16c may transmit data changes and transactions to the server database 15d that affect data in the server database 15d. The data changes that have occurred at the client computer system 1 6c that affect data in the server database are indicated by the modification files 105. The server database 15d is then updated with the changes from the client computer system and the corresponding changes are made to the modification files associated with the groups that had data modified by the client.

The database management system 100 may access the appropriate modification files that correspond to the data groups to which the client has access. These modification files contain a sequence of transactions and sequence of operations that have occurred to the corresponding data groups. The modification files 86 that correspond to the data groups to which the client has access are then transmitted to the client computer system 16c. In previously known systems, a single client file was sent to the client database management system. Unlike previously known ICDB systems, multiple modification files that are associated with selected groups of data are transferred to the client computer system. The client computer system 1 6c evaluates each of the modification files to determine which updates should be deleted, reorganized, or merged to properly synchronize, as explained below in more detail, the local database 15c with the server database 15d. The client computer systems 16 may filter and/or merge modification files 80 to ensure database integrity. The database management system 106 uses a filter processing module 108 to filter and merge the multiple modification files received from the database management system 100.

As illustrated in FIG. 2, more than one modification file may be associated with a single group. For each set or series of modification files associated with a single group, such as modification files 86a and 86aa, sequence numbers are associated with each of these modification files. When the client computer system 16c accesses the server 18, the client computer system transmits to the server the sequence number of the last update file it received from the server. The server then transmits only those modification files that were not previously transmitted to the client computer system 16c based the sequence number received from the client computer system 16c. The server sends only those modification files with a sequence number greater than the sequence number received from the client computer system. A separate modification file 86 may be created for a group when the number of transactions contained within the file exceed a certain number, after a certain time period has expired, or after a certain set of connected client computer systems completes making changes to the data of certain groups. Other schemes for determining when multiple modification files should be created for a group are readily apparent to those skilled in the art and are within the scope of the present invention.

Referring to FIGS. 3a, 3b, and 3c, a basic client grouping scheme is illustrated. The grouping example of FIGS. 3a, 3b, and 3c are discussed in terms of a relational database and relational database programming techniques. The grouping of data can be achieved in different ways. The appropriate grouping for a particular system depends on many factors including server processing speed, server disk space, and the network bandwidth. Grouping techniques can be divided into two categories: dynamic and static.

In static grouping, which is illustrated in FIGS. 3a, 3b, and 3c, the data groups are known a priori. In static grouping, an administrator can define the groups. Client computer systems subscribe to or are associated with selected groups. Static grouping reduces the server processing requirements by handling the modification file dissemination independent of the connected clients. As known to those skilled in the art, the horizontal or vertical segments of relations of data are termed fragments and are defined by a priori by a partitioning scheme. Fragments are contained in one or more groups.

Although not illustrated, dynamic grouping can be used. In dynamic grouping, the number and make up of the groups depend on constantly changing attributes such as the current set of transactions and/or current set of connected clients. With one type of dynamic grouping, a separate group exists for each transaction and the client computer systems subscribe to the groups depending on the applicable transaction. This type of grouping is called transaction-set grouping. Another type of dynamic grouping is power-set grouping. In power-set grouping, a minimal number of groups are formed to ensure that the clients have to subscribe to the minimal number of groups and will receive minimal superfluous data.

Dynamic grouping techniques help reduce bandwidth and client filter processing by sending only data relevant to the current set of connected clients. However, these techniques typically require more server processing because the server dynamically coordinates groupings to handle the combination of clients and data. In the power-set grouping, the server coordinates the group updates for dissemination for each set of connecting clients. In a transaction-set server environment, the server communicates with each client individually to handle the updating operations for the relevant client.

Referring specifically to FIG. 3a, a manner in which server data can be organized is shown. A student record 112 contains a student ID 114, a student name 116, a student phone number 118, and a variable for class 120 which may be undergraduate students 122 or graduate students 124. The general server scheme also includes an enroll record 134 which includes a student ID 136, the course ID 138 and a grade ID 140. Another record of the server data set-up scheme includes a course record 150 that includes a course ID 152, course name 154 and a class variable record 156 that contains an undergraduate specification 158 and graduate students specification 160.

Referring to FIG. 3b, a table of group identifiers is shown. The group identifiers 202, 206, 210, 214, and 218 are shown associated with or assigned to the groups of data of the database. The undergraduate students identifier 202 includes the student information 112, where the class is specified as undergraduate students 122, minus the telephone number 118. The graduate student group identifier 204 includes the student information 112, where the class is identified as graduate students 124 without the phone number 118. The student-phone group identifier 206 includes the student record 112 with only the student ID 114 and the phone number 118 specified. The all-courses identifier group 212 includes all data courses at the record 150. The all-enrolled class 216 includes all of the data of the enroll record 134.

Referring to FIG. 3c, an assignment of clients to groups is illustrated. This table is first accessed by the database management system of the server to determine which modification files 86 should be retrieved for a client. The undergraduate clients are assigned to the groups undergraduate students 202, all-courses 214, and all-enroll 218. The graduate student clients are assigned to the graduate students group 206, all-courses 214, and all-enroll 218. The professor clients are assigned to the graduate student groups 206, undergraduate student group 202, student-phone group 210, all-courses 214, and all-enroll group 218. The enroller client is assigned to the all-enroll group 218 data. This group data and associations are used to update and synchronize computers within the ICDB system 10.

The server 18 processes batched updates received from the clients 16 and the updates performed on the server 18 create a delta file for each group, based on the knowledge of the data shared with each client. Referring to FIG. 4, a modification file (delta file) 86 is illustrated. The modification file 86 for a client contains all of the operations on the data set that correspond to the changes to group data to which the client is assigned. The modification file 86 includes a sequence of transactions such as transaction A, transaction C, transaction R and transaction J, each of which is identified by a unique global sequence number (e.g., 1, 2, 3, 4, 5, . . . ) which indicates the order of execution of the transactions at the server 18. Each transaction represents a sequence of operations 410 and each operation has a unique sequence number, such as OP1, OP2, OP3, OP4, and OP5 which indicate the order of execution of the operation within the transaction. Each operation applies only to a single fragment. Each transaction identifies the client computer system 16, on which it was originally executed as part of the transaction record. A client ID number 416 is associated with the transaction.

By using the transaction sequence numbers 404, a computer system 16 can reconstruct the order of execution of the operations that occurred at the server 18 despite the fragmentation of operations in the modification files 400. Because each operation executes with a single fragment, there are no interrelation dependencies among these operations, except foreign key dependencies. The interrelation operations on relations with no foreign key dependencies can be arranged in any order. Intrarelation operations preserve the serial order at the server. Assuming a foreign key is from a relation called the "parent relation" and a primary key is from a relation called a "child relation", interrelation operations on relations with foreign key dependencies are ordered so that an insert into the parent relationship precedes the corresponding insert into the child relation; and a delete in the child relationship precedes the corresponding delete in the parent relation.

Filtering

As noted above, the various groups of data may contain information that a particular client should not receive or information which the client already has. For example, if a client made a change to data within the database, then the client already has the change or a record of the change that was made to the database. Consequently, when modification files which contain all operations that have been performed include the update operations performed by a particular client, the operations performed by the particular client do not need to be processed or utilized when the client computer system 16 receives the modification files 86 for its associated data groups. Consequently, the client computer system 16 performs filtering, mapping, and merging operations to help ensure the integrity of the local database when updates are being made. The types of processing occurring at the client computer system 16 include reflection filtering, schema mapping, intrarelation filtering, interrelation filtering, duplicate filtering, operation merging, and a referential integrity ordering. The discussion of filtering herein utilizes the example groups of FIGS. 3a, 3b, and 3c.

Reflection filtering refers to the client computer system evaluating the modification files 86 for transactions that were submitted to the client computer system that originated from the client computer system. Schema mapping is a process by which clients apply synonym conversions to names for groups which are named differently in the local database 15c than the server database 15d. This ensures that groups are properly matched during updating to ensure data integrity for the groups within the databases. Data filtering for a relation based on data internal to the relation is termed intrarelation filtering. Intrarelation filtering filters superfluous column and row data that may be sent to a client. For example, undergraduate students receive data from the enroll relation; however, the undergraduate clients are not authorized to view grade data. Therefore, the grade information is dropped or deleted from the enroll record group when it is transmitted to the undergraduate student. Similarly, graduate clients receive all of the data from the courses record; however, the graduate students are only authorized to view the graduate course information. In the example shown in FIGS. 3a, 3b and 3c, filtering the courses group for the undergraduate students means that the graduate information is deleted or dropped.

"Data filtering" for a group that is shared based on data in another database table is termed interrelation filtering. Interrelation filtering occurs because not all superfluous data is filtered by data within a group. For example, undergraduate clients should receive only the enroll group data 218 for undergraduates; however, to determine if an enroll group 134 is for an undergraduate, the course ID must be determined using the course group 134. In the grouping example of FIG. 3b, an undergraduate student receives all of the enroll data in the all-enroll group 218. An undergraduate client then uses the courses group 214 to determine what enroll data should be filtered out. Duplicate discarding refers to the process of detecting and deleting/discarding duplicate transactions. Duplicate transactions occur because the same data may be duplicated in more than one group. In the example of FIGS. 3a, 3b, and 3c, the professor clients join the undergraduate students group 202, graduate students groups 206, and students phone groups 210. For example, the deleting of a student would result in a transaction being sent twice to a professor client because a student-phone group 210 and the undergraduate-student groups 202 are defined based upon the students 112 record. In each of those, the student ID 112 is present. Therefore, the professor client must detect the duplication transaction and carry out a single deletion for the local database 15d.

"Operation merging" includes the merging of operations that are broken up when placed into groups. Transaction operations may be broken up when placed in groups. Clients must ensure that these operations are merged such that integrity is maintained. Consider the following sequence of operations at the server, INSERT (1000, "John Smith", 555-5555, UNDER) INTO Students;

DELETE FROM Students WHERE StudentID=10000

This sequence of operations would be broken up into the following sequences for groups Under-Students, and Students-Phone, respectively:

INSERT (1000, "John Smith", UNDER) INTO Students;
DELETE FROM Students WHERE StudentsID=1000; and
INSERT (1000, 555-5555) INTO Students;
DELETE FROM Students WHERE StudentID=1000;

A professor client must merge the transactions from the Under-Students and Students-Phone such that (1) the inserts are merged into a single insert, (2) duplicate deletes are eliminated and (3) the merged insert is executed before the delete.

"Referential integrity ordering" includes processing the modification files to ensure that transactions which reference other groups during a merging transaction maintain their integrity. When merging transactions, clients must be aware of referential integrity constraints. Executing transactions out of order at the client may result in operation rejections at the client which were allowed at the server, leading to degradation of client data integrity. Consider two inserts at the server:

INSERT (6555, "Queuing Theory", GRAD) INTO Courses; followed by,

INSERT (1001, 6555) INTO Enroll;

These two inserts would be received by graduate student clients from the groups All-Courses and All-Enroll, respectively. Observe that "Courses.Course ID" is a foreign key of Enroll.CourseID; consequently, the order of the inserts must be preserved, specifically the tuple for the Courses table must be inserted prior to the Enroll tuple insertion. In general, some ordering needs to be preserved among operations on different relations that are related by a referential integrity constraint.

Processes of the ICDB System

Figure 5A:
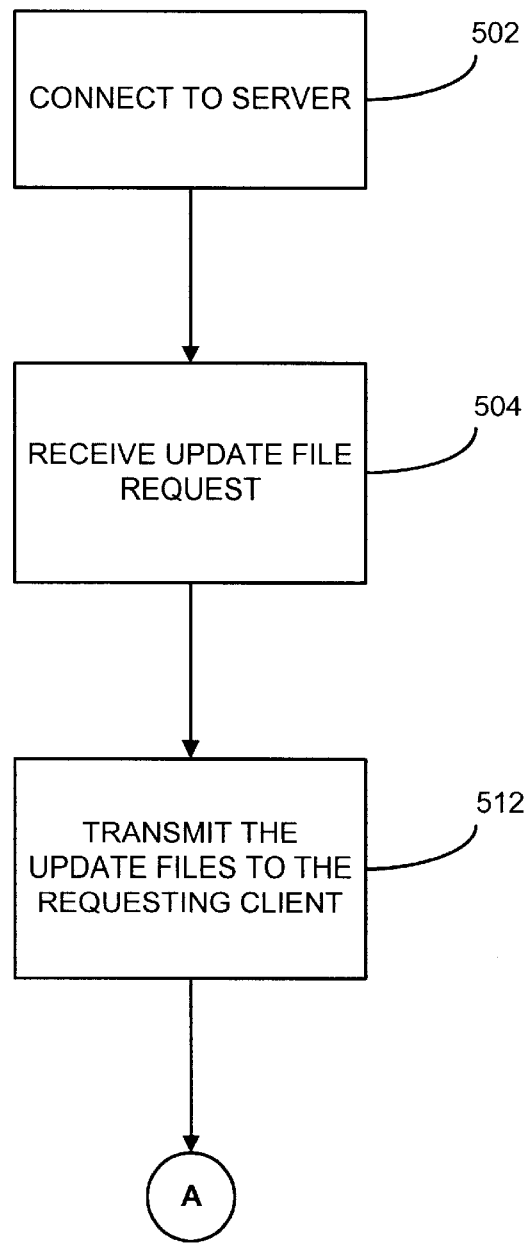
FIGS. 5a, 5b, and 5c are flow diagrams of the processes implemented according to the principles of the present invention.
Figure 5B:
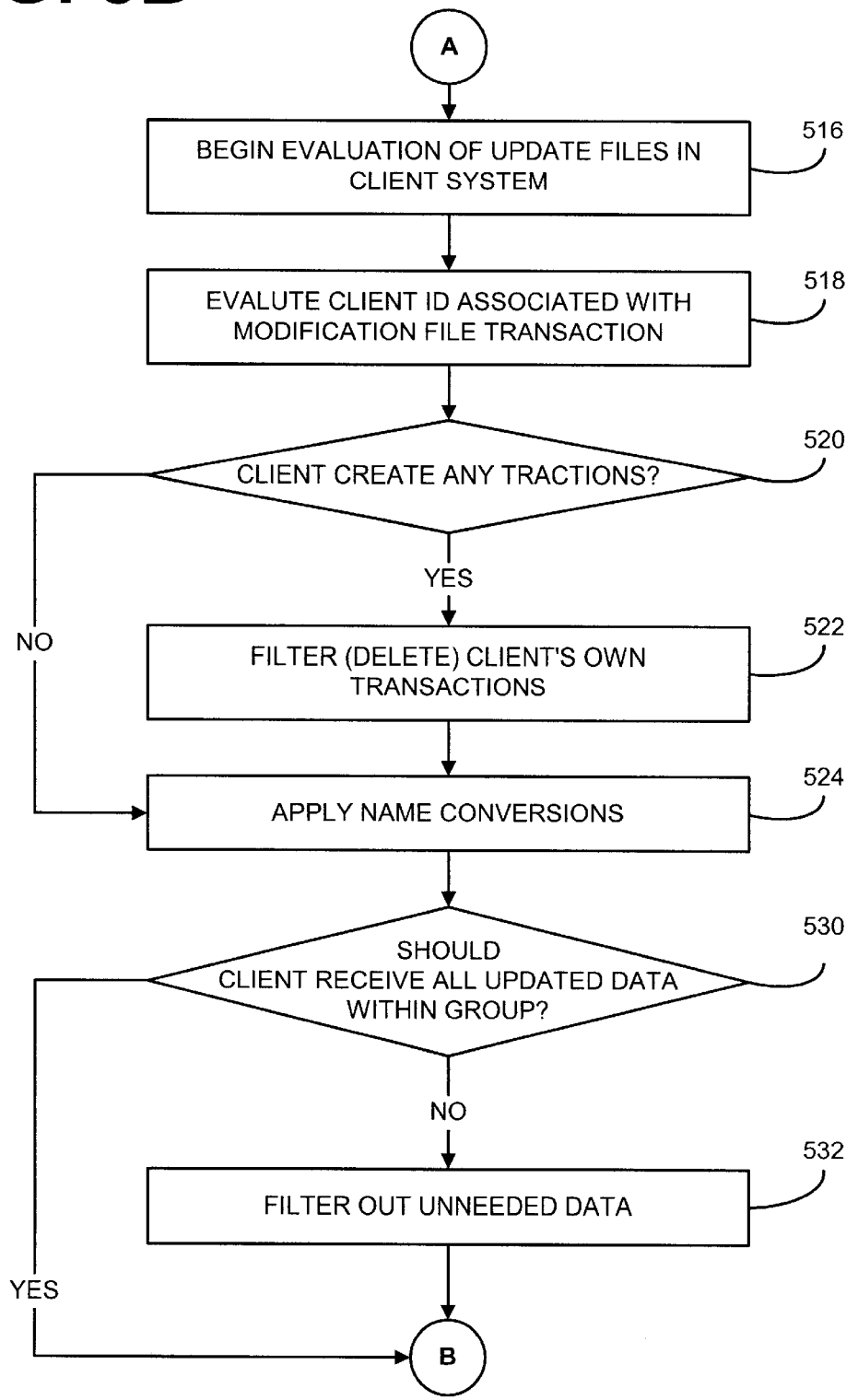
Figure 5C:
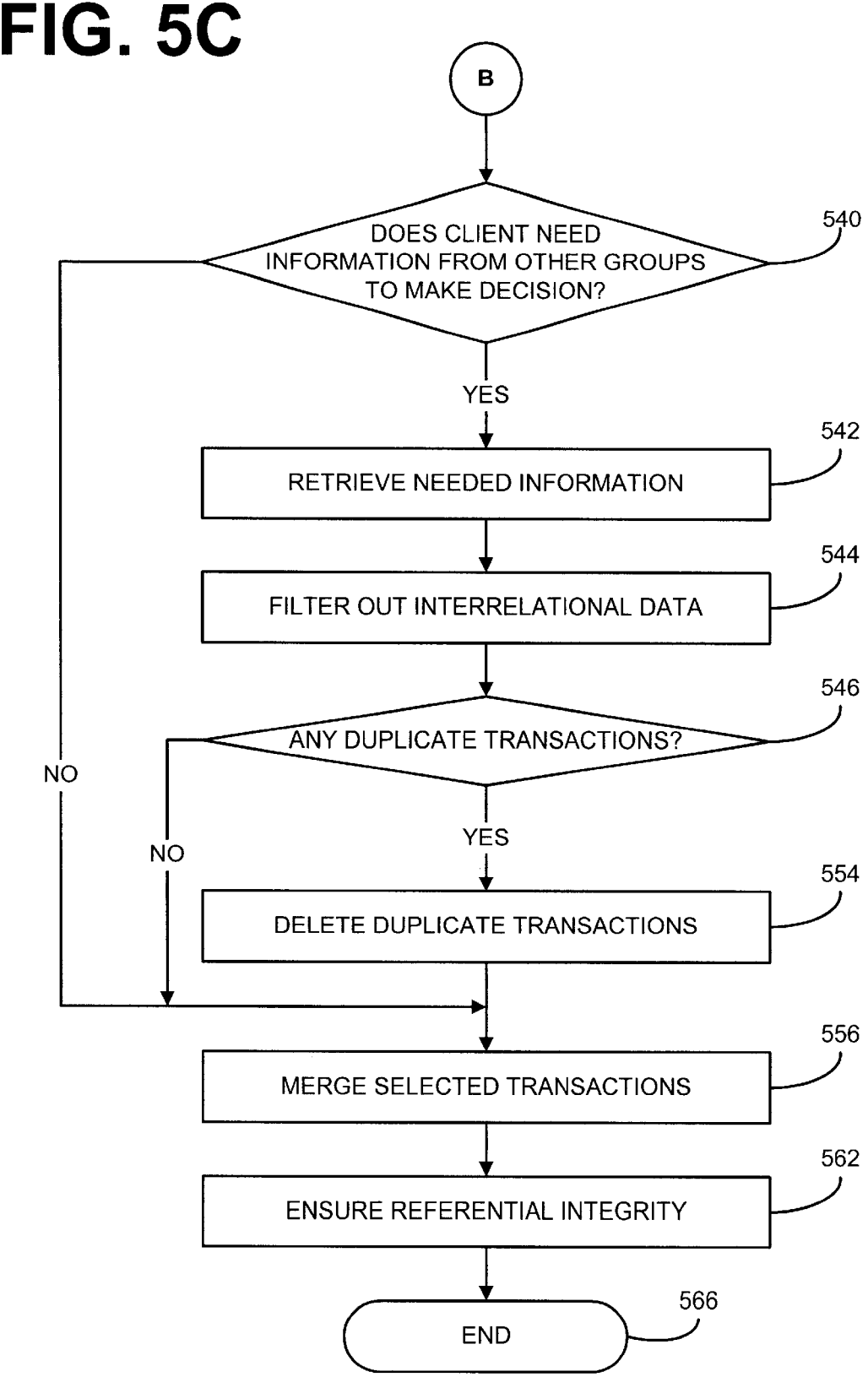

Referring to FIGS. 5a, 5b and 5c, the processes implemented according to the principles of the present invention are illustrated. These processes describe the process utilized to associate client computer systems 16 with the data groups of the server database 15d during the coupling of the server database 15d to the client computer system 16. The processes also describe the synchronization process between the databases of the ICDB system 10. At step 502, the client computer system 16 connects to the server 18. At step 504, the server 18 receives the update request from the client computer system. At step 512, the modification files 86 are transmitted to the requesting client computer system 16. At step 516, the client computer system 16 begins an analysis of the modification files 400 to determine what data from the modification file 86 should be filtered, merged, deleted or otherwise modified.

At step 518, the process evaluates the client ID and the modification file, and at step 520, the process determines whether the client computer system 16 created any transactions in the modification file. If the client did create any of the transactions, the process proceeds to step 522 where the transactions that the client created are filtered out. The process then proceeds to step 524. If, however, at step 520, none of the transactions where created by the client, the process proceeds to step 524. At step 524, the client computer system applies synonym conversions or names, if necessary, in the client database system as discussed above. The process then proceeds to step 530. At step 530, the process determines whether the client should receive all data within the group. The process proceeds to 532 where a duplicate data is filtered out. The process then proceeds to step 540. If, however, at step 530, the client was to receive all data within the data group, the process proceeds directly to step 540.

At step 540, the process determines whether the client computer system 16 needs information from other groups to make a reliable update to the local database 15c. If the client 16 needs information from other groups to update certain information, the process proceeds to step 542 where the information needed to make the updates from other groups is retrieved. The process proceeds to step 544. At step 544, the process filters the interrelational data to locate the needed information as discussed above. The process proceeds to step 546. At step 546, the process determines whether transactions are duplicated. If, at step 546, no transactions are duplicated, the process proceeds to step 556. If, however, at step 546, the processing determines that transactions are duplicated, the duplicate information is deleted at step 554. At step 556, the process determines whether any operations detected in the modification files should be merged and merges the files as necessary. The process then proceeds to step 562 where the referential integrity of the modification files is evaluated. The process ends at 566.

The descriptions given herein are provided as examples and are not intended to limit the principles or scope of the present invention. Those skilled in the art will readily appreciate from a review of descriptions herein that many modifications, changes or extension may be made from the specific embodiments described herein without departing from the scope of the invention defined by the following claims.

What is claimed is:

1. A method for updating databases on a client computer, comprising:

grouping data of a server database based on selected criteria;

assigning one or more of the groups to be accessible to certain client computers;

recording changes to data of each group in a corresponding modification file;

transmitting said modification file to the client computer system having a local database which contain selected portions of data from at least one of said groups assigned to the client computer;

deleting unnecessary information from the modification file; and updating said local database of the client computer system using said necessary information from said modification file.

2. The method of claim 1 further comprising associating a plurality of modification files with a group and tracking which of the plurality of files have been sent to particular client computer systems.

3. The method of claim 2 further comprising associating unique sequence numbers with each of the modification files.

4. The method of claim 1 wherein said step of grouping said data is based on preselected static criteria.

5. The method of claim 1 wherein said step of grouping said data is based on dynamically generated criteria.

6. The method of claim 1 further comprising the step of updating local databases of the client computer systems using the modification files created to record changes to data within the groups to which the client computer systems are assigned.

7. The method of claim 1 further comprising the step of transmitting, by said client computer system, modifications made to said selected portions to said server database; and updating said server database with said modifications to said selected portions of data.

8. The method of claim 7 comprising:

determining which data of the groups of the server database have changed and creating modification files based on these changes and determining to which selected groups the client computer system is assigned; and in response to determining the selected groups associated with the client computer system, transmitting the modification files associated with the selected groups to the client computer system.

9. The method of claim 8 further comprising the step of evaluating the modification files at the client computer systems to determine whether data in a first modification file contains modifications which are relevant to modifications contained in a second modification file; and processing the relevant modifications to ensure that consistency is maintained between the server database and the local database.

10. The method of claim 9 wherein said step of processing includes determining which modifications in the modification files are duplicated in a modification file associated with another group and maintaining one modification for the duplicated modifications and deleting the other duplicate modifications.

11. The method of claim 9 wherein said step of processing includes merging relevant information between the files to form a transaction that maintains the consistency of the local database with the server database.

12. The method of claim 10 wherein said step of processing includes determining which transactions of the modification files were created by the client computer system being updated and deleting those modifications from the modification files that were created by the client computer system being updated.

13. The method of claim 1 wherein said step of recording changes includes maintaining a client list of changes which have been modified since the previous time period in which a client computer system was coupled to said server database.

14. The method of claim 1 wherein said step of assigning comprises maintaining a client index of client computer systems, said client index associating each client computer system with a group of data that is associated based on the content of the data items.

15. The method of claim 1 comprising:

determining which client computer system is coupled to the server database and determining to which selected groups the client computer system is assigned; and in response to determining the selected groups associated with the client computer system, transmitting the modification files associated with the selected groups to the client computer system.

16. A system for updating client computer systems based on data in a central computer system, comprising:

a plurality of client computer systems;

a server computer system containing a server database, said server database containing data that is grouped based on preselected criteria, and wherein each of said plurality of client computer systems is assigned to a group;

a modification file created for each data group in which data has changed, in the server computer system, said modification file including a list of modification transactions that have occurred within the data group in which data has changed; and a program module that deletes unnecessary information from the modification file and updates local databases of the client computer systems based on necessary information changes in the modification files.

17. The system of claim 16 wherein the server computer system associates corresponding clients with selected data groups.

18. The system of claim 16 wherein the client computer system contains a client program module that evaluates each of the modification files and updates the local database based on an evaluation and comparison of the information in the modification files.

19. The system of claim 18 wherein the client program module updates the local database by merging information from within modification files.

* * * * *